United States Patent [19]

Riley

[11] Patent Number: 5,503,260
[45] Date of Patent: Apr. 2, 1996

[54] CONVEYOR SAFETY ASSEMBLY

[76] Inventor: Ron J. Riley, 1323 W. Cook Rd., Grand Blanc, Mich. 48439

[21] Appl. No.: 311,413

[22] Filed: Sep. 23, 1994

[51] Int. Cl.$^6$ ..................................... B60L 3/04
[52] U.S. Cl. .............. 191/4; 246/187 R; 307/9.1
[58] Field of Search ................. 191/2, 3, 4, 5, 191/8; 307/9.1, 141, 326, 328; 246/186, 187 R

[56] References Cited

U.S. PATENT DOCUMENTS

| | | | |
|---|---|---|---|
| 4,091,319 | 5/1978 | Nguyen | 191/4 X |
| 4,129,203 | 12/1978 | Berman | 191/4 X |
| 4,795,859 | 1/1989 | Kato et al. | 307/9.1 X |
| 4,892,980 | 1/1990 | Riley. | |
| 4,919,057 | 4/1990 | Riley. | |
| 4,924,164 | 5/1990 | Riley. | |
| 4,984,521 | 1/1991 | Riley. | |
| 5,323,098 | 6/1994 | Hamaguchi et al. | 246/187 R X |
| 5,382,834 | 1/1995 | Young | 307/9.1 |

FOREIGN PATENT DOCUMENTS

| | | | |
|---|---|---|---|
| 0386812 | 9/1990 | European Pat. Off. | 191/4 |
| 2336819 | 7/1977 | France | 191/4 |
| 2456838 | 6/1975 | Germany | 191/4 |
| 6032186 | 2/1994 | Japan | 307/9.1 |

Primary Examiner—William E. Terrell
Assistant Examiner—Scott L. Lowe
Attorney, Agent, or Firm—Howard & Howard

[57] ABSTRACT

The conveyor safety circuit (40) is connected on remotely operated vehicles (12) each having on-board controllers (28) which automatically run along guide rails (18) powered from power rails (20) extending along the guide rails (18). The safety circuit (40) interrupts power to the on-board controllers (28) when neutral is lost or during power down. The safety circuit (40) will provide power to the vehicle (12) during brief interruptions of power or neutral, i.e., brush skips, without vehicle (12) shut down.

17 Claims, 4 Drawing Sheets

CONVEYOR SAFETY ASSEMBLY

TECHNICAL FIELD

The invention relates to conveyor control systems having self-propelled vehicles which move along a guide rail and which are powered remotely from such rails, and more particularly to an intervening safety circuit which allows brief interruptions of power while preventing powering of the vehicle when power or neutral is lost.

BACKGROUND OF THE INVENTION

Conveyor control systems have included self-propelled vehicles which have a motor thereon to rotate wheels on the vehicle to move the vehicle along a guide rail. The motor receives power from power rails running along the guide rail. Each vehicle is self-propelled so that if a vehicle breaks down, the vehicle can be removed without a total shut down of the conveyor system.

The following patents issued to the same inventor of this invention, relate to such a conveyor system. U.S. Pat. No. 4,984,521, issued Jan. 15, 1991 entitled Conveyor Control, and U. S. Pat. No. 4,892,980, issued Jan. 9, 1990 entitled Dual Contacts On Voltage Rail, and U.S. Pat. No. 4,924,164, issued May 8, 1990 entitled Software Zoning of Conveyor Control, and U.S. Pat. No. 4,919,057, issued Apr. 24, 1990 entitled Conveyor Control Through Binary Coding. Each of these patents relate to a conveyor control system which has self-propelled vehicles with wheels, each driven by a motor to move the vehicle along guide rails. The system includes power rails for supplying power to the vehicle and may have at least one command rail which transmits a command signal indicative of a requested speed. The command signal may be in the form of an analog signal or a digital signal. Each vehicle includes control circuitry which interrupts the command signal to drive the vehicle at the requested speed. Other circuitry may be included to slow or stop the vehicle due to other vehicles in its path or faults in the circuit.

Such conveyor systems commonly use contact brushes which run along the power rails to receive power and transmit same to the vehicle. Such contacts at many times may periodically lose source power or lose neutral power. Industrial control standards call for a master control relay to provide safety to the control system and particularly to the vehicle in case of failure. Brief interruptions of the power or neutral cause the master control relay to deenergize, resulting in frequent nuisance of power downs. As a result of such power downs, many conveyor manufactures do not have a master control relay included on the on-board vehicle controls. An undesirable effect is that the whole vehicle can become electrically hot when loss of neutral occurs, leading to injury or electrocution. Another safety problem is that a failure in the drive electronics can result in a runaway vehicle.

SUMMARY OF THE INVENTION

The invention includes a safety assembly for use in a remotely powered vehicle system including a vehicle movable about a guide track and including contacts on the vehicle for contacting neutral and source power conductors extending about the guide track to supply power to an on-board controller and motor on the vehicle which provides movement thereof. The assembly comprises a power storage component for receiving power through the vehicle contacts from the source and neutral power conductors to store power. Also included is a power switch circuit connected between the power storage component and the vehicle motor for connecting power to the vehicle motor for a predetermined time upon interruption of power to the contacts or loss of neutral power and disconnecting power from the vehicle motor when no power is received on the contacts during the predetermined time.

The invention also includes a method of controlling power to the remotely powered vehicle system. The method includes the steps of: receiving power from the vehicle contacts off the power conductors; storing powering from the contacts; sensing an interruption of power on the contacts; supplying power to the motor while power is received on the contacts and for a predetermined time after interruption of power has occurred; and disconnecting power from the motor after the predetermined time during which interruption of power has continued.

Advantages of the invention include that the power storage component has enough storage capacity to maintain the power switch circuit connected during brief power interruption caused by contact skips. Loss of the neutral line will shut the system down after a time delay. This time delay is set long enough to ignore contact skips but short enough to protect against complete loss of the neutral power.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1:
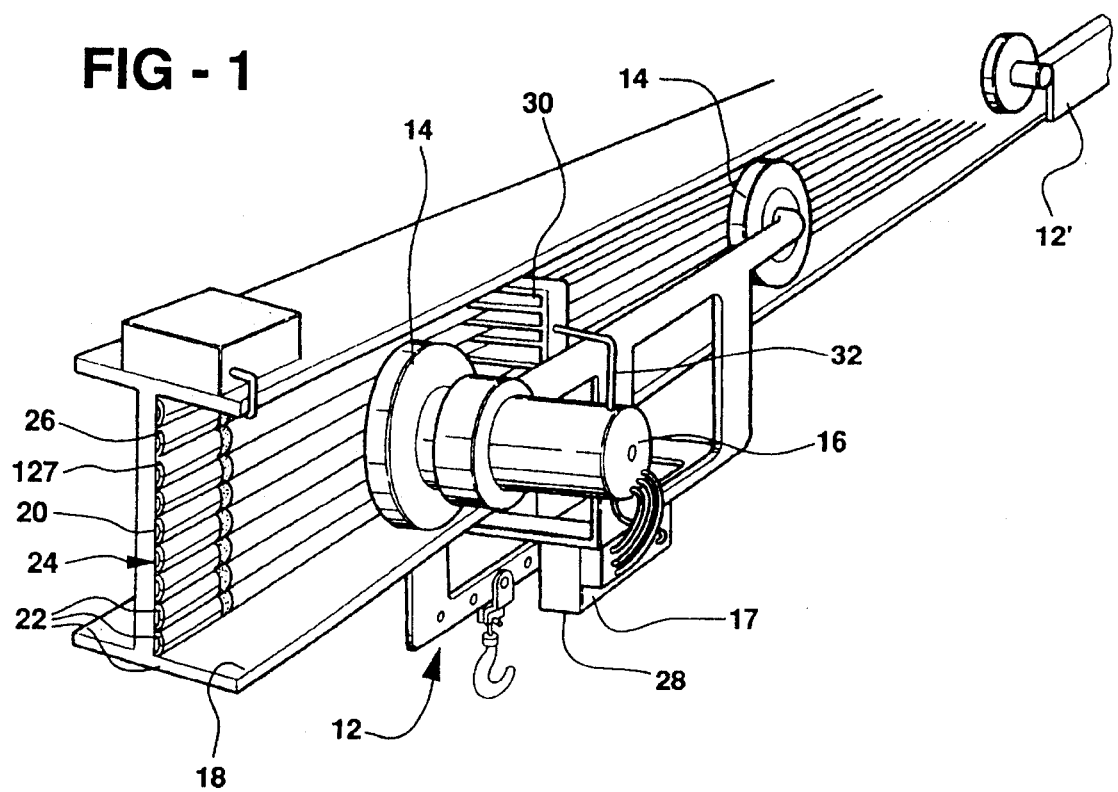
FIG. 1 is a perspective view of a portion of a conveyor control system with self propelled vehicles.

A conveyor control system which is powered from power rail voltages is generally shown at 10 in FIG. 1. The conveyor control system 10 includes a self-propelled vehicle 12 which has wheels 14 for mobility. The vehicle 12 has a motor 16 for rotating the wheels 14 to move the vehicle 12 at various speeds. The motor 16 is driven by three phase ac power. Alternatively, other motors may be used as will be understood by those skilled in the art, such as a dc drive, servo, etc.

The conveyor control system 10 includes a guide rail 18 for supporting the vehicle 12 and guiding the vehicle 12 along a predetermined path. The system 10 also includes a plurality of transmission rails 20 which includes source power rails 22 for supplying power to the motor 16. The power supply rails 22 include three rails (each of the three rails carry one phase of the power supply voltage of the three phase power supply). Also included is a neutral or ground rail 24. The plurality of rails 20 also include at least one command rail 26 for producing a command signal along the command rail 26 which is indicative of a requested speed. Such a system is specifically disclosed in U.S. Pat. No. 4,984,521, discussed in the Background of the Invention, and incorporated by reference herein. Other alternatives of controlling the vehicle speed may be of such disclosed in U.S. Pat. No. 4,924,164, also discussed in the Background of the Invention, and incorporated by reference herein.

The conveyor control system 10 includes a vehicle controller 28 within each of the vehicles 12 in the system 10 which receives the command signal and interprets it to drive the motor 16 to move the vehicle 12 at the requested speed. The motor 16 may include an invertor 17 which drives the motor 16 from the controller 28. The controller 28 operates from received power from the rails 22, 24 to send a modified signal to the inverter 17. The inverter 17 is of the standard type which uses the dc signal and receives the three phase power to modulate the width of pulses which drive the motor 16. The width of the pulse varies the power to the motor 16 which is synchronized to frequency making it a variable speed motor 16. Alternatively, other types of motor arrangements and control systems may be used with the subject invention which do not incorporate an inverter 17. In some applications, the inverter 17 may be omitted with the controller 28 directly sending a signal to the motor 16, and the motor connected to the power rails 22, 24.

The controller 28 may be as specifically set forth in U.S. Pat. No. 4,984,521 or U.S. Pat. No. 4,924,164 or U.S. Pat. No. 4,919,057, all incorporated by reference herein and discussed in the Background.

The vehicle 12 is connected to the source and neutral power rails 22, 24 by power conductors 30. In the preferred embodiment, such power conductors 30 are contact brushes which slide along the rails 22. Such power conductors 30 electrically conduct the electrical signal or power from the rails 22, 24 through hardwire power lines 32 to provide power to the motor 16 or inverter 17 and the controller 28. The power lines 32 may be connected to transformers which convert the ac power to a dc voltage for use by the controller 28 as indicated by vehicle dc power 34. The configuration of contact brushes 30 for acquiring the power may be as that specificly described in U.S. Pat. No. 4,892,980, discussed in the Background of the Invention, and incorporated by reference herein. Various types of contact brushes or other conductor elements 30 may be used to pick-up the signals, as commonly known in the art.

Alternatively, power may be supplied by an inductive loop imbedded in the guide rail. The power conductors 30 would comprise a pick-up coil inductively coupled to the inductive loop or induction cable. Such a system may be of the type made by Daifuku, type Ramrun-HID.

Figure 2:
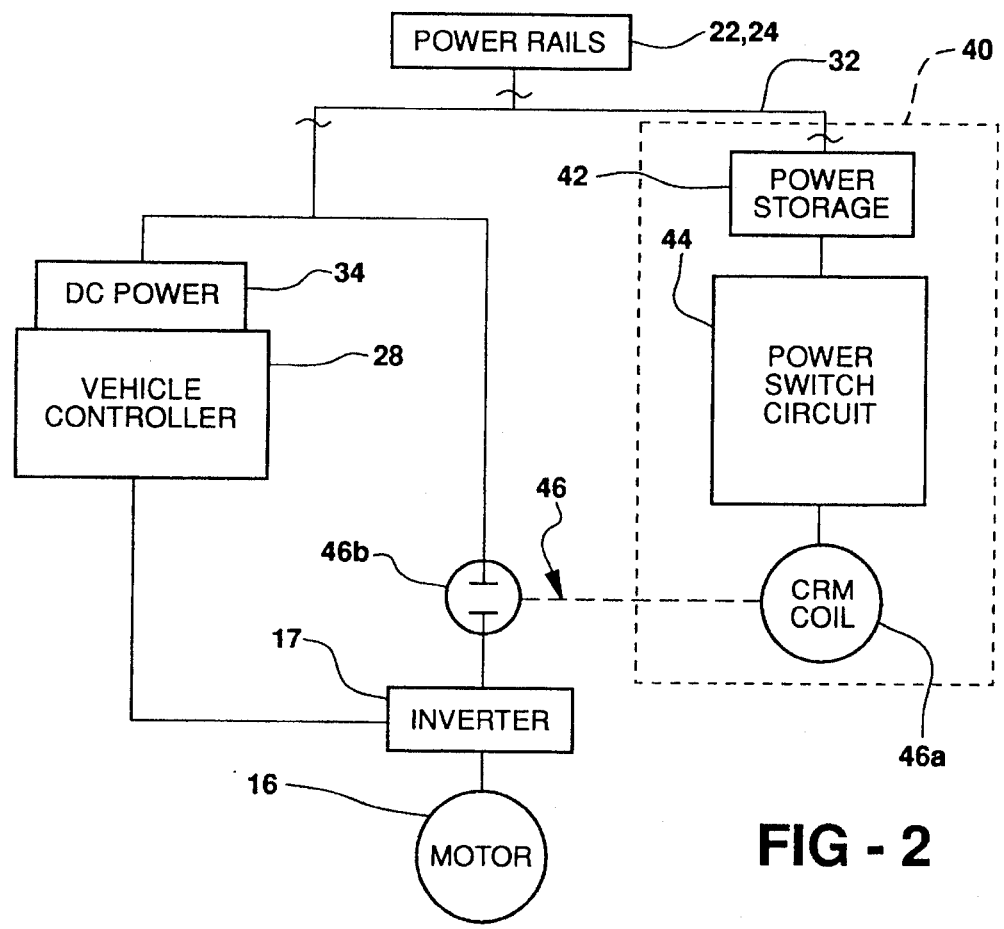
FIG. 2 is a general block diagram of safety assembly and control circuit of the self-propelled vehicle.

The conveyor control system 10 includes a safety assembly 40 for use in the vehicle 12 for interrupting power under prescribed conditions. As generally illustrated in FIG. 2, the safety assembly 40 includes a power storage component 42 for receiving power from the power conductors 30 or hardwire lines 32 for storing power. The assembly 40 also includes a power switch circuit 44 operatively connected to the power storage component 42 for controlling the connection of power from the power conductors 30 to the vehicle 12 for a predetermined time upon interruption of power to the power conductors 30 and for disconnecting power from the vehicle 12 when no power is received on the power conductors 30 during the predetermined time.

The safety assembly 40 includes a switch or power relay circuit 46 for connecting the power from power conductors 30 to the inverter 17 or the motor 16 and for disconnecting power from the motor 16 upon cessation of power on the power conductors 30 after a predetermined time and to connect power to the vehicle motor 16 when receiving power and during loss of power for less than the predetermined time. More specifically, the power relay circuit 46 comprises a power relay which interconnects the power rails 22, 24 supplied by the lines 32, to the inverter 17 or motor 16 to provide a safety mechanism. As long as power is received, i.e., both source and neutral, the power relay circuit 46 will remain closed and the vehicle 12 will proceed under normal operation. When the relay circuit 46 is opened, powering of the motor 16 is disconnected and movement of the vehicle 12 is prevented. The power storage component 42 stores power enough to maintain the power relay 46 closed during short power interruptions. The power switch circuit 44 controls the power relay 46 in response to power on the power conductors 30 and the power storage component 42 to interrupt power after a predetermined time of not receiving power. More specifically, the relay 46 may comprise a relay coil 46a controlling operation of a relay contact or switch 46b, as commonly known. Such interruptions of power may be due to brush skips, power loss on the rails, crossing between adjacent power zones on the power rails or in an inductively coupled system, or coil alignment problems.

The safety assembly 40 may receive only one source power 22 and the neutral power 24 to control switching, or may alternatively receive all three phases of power 22 to switch power on only when all three phases and neutral is received to maintain proper phasing.

There are five embodiments of the safety assembly 40 which practice the general teachings of the subject invention of FIG. 2 and are illustrated in FIGS. 3–7. These specific embodiments will be hereinafter described. It is to be understood that each of the embodiments utilize the power relay 46 to connect or disconnect power from the controller 28. The power storage component 42 in each of the embodiments is connected to the hardwired lines 32 for sensing and detecting power from the rails 22. Each of the embodiments will be hereinafter described. Equivalent elements in function will be indicated by the same last two digits of a reference numeral, with the first digit indicative of the embodiment.

Figure 3:
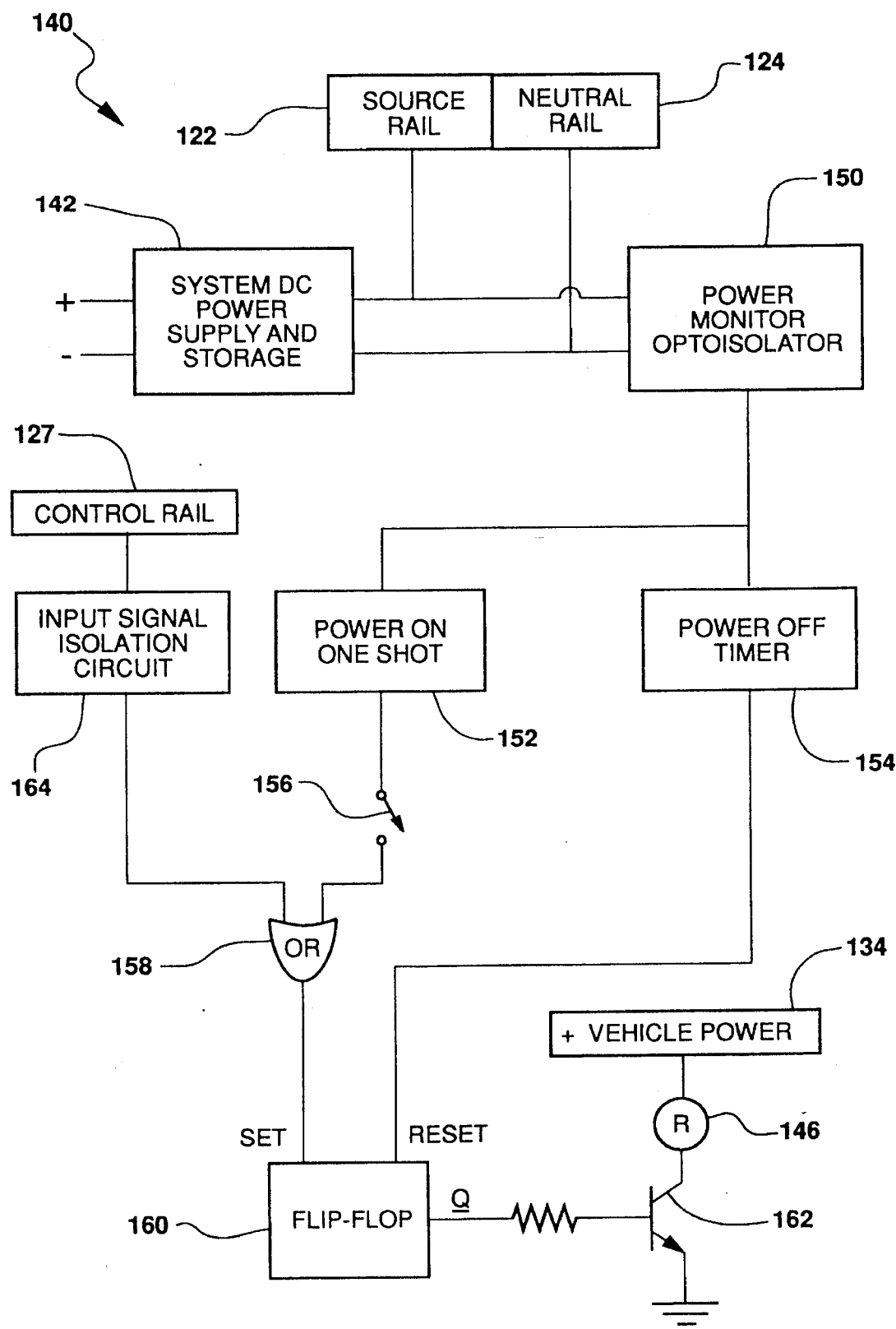
FIG. 3 is a schematic diagram of a first embodiment of the subject invention.

The first embodiment 140 is illustrated in FIG. 3. The assembly 140 includes a power monitor opto-isolator circuit 150 connected to the power conductors 30 on at least one source power rail 122 and on the neutral power rail 124. The opto-isolator circuit 150 provide a level translation signal. The opto-isolator circuit 150 is commonly known in the art and may comprise an "opto 22 dc input module". Also connected to the power rails 122, 124 is the power storage component 142, which generally has enough power storage to maintain the relay closed for the predetermined time. The power storage component 142 may comprise a power storage supply such as a transformer receiving power from the rails 122, 124 and connected to a full wave diode rectifier and to a storage capacitor, i.e., electrolytic capacitor. Alternatively, the transformer and rectifier may be substituted with an off-the-shelf open frame power supply. Other circuitry or electronics may perform such functions as commonly known in the art. Also included is a power on one shot 152 producing a set output and a power off timer 154 producing a reset signal, both connected to the opto isolator 150. The power on one shot 152 is connected via a enable switch 156 to an OR gate 158. The output of the OR gate 158 is connected to the set input of a flip flop 160 (type 4013).

The flip flop 160 has a set and reset input, and a control signal output to control the relay 146. The power on one shot 152 will set the flip flop 160 to close the relay switch 146. The power off timer 154 is connected to the reset input of the flip flop 160. The control signal or q output is connected to the base of a transistor 162 which has its collector connected to the power relay 146 to the power storage component 142. Also connected to an input of the OR gate 158 is an input signal isolation circuit 164 for receiving an input signal off an external separate control rail 127 to set the flip flop 160, which may be optionally manually set at a central station in the conveyor system 10. The power on enable switch 156 is a manual switch whereas the input signal may be remotely controlled to re-power the vehicle 12 upon interruption of power. In operation, each of the vehicles 12 must be initialized by either the enable switch 156 being closed or the remote input 164 receiving a start signal to set the flip flop 160. The switch 156 may be a dip switch, which when closed will allow the vehicle 12 to be powered automatically when the power rails 122, 124 are powered and the power conductors 30 receive power; when open, the vehicle 12 will remain unpowered after the reset signal is set, or until the remote input 164 is received, or until switch 156 is manually closed. The start command signal for the remote input signal isolation circuit 164 may be carried on control rail 127 as indicated to provide the start signal. Once set, the flip flop 160 will allow powering of the transistor 162 and relay 146 until such time a reset signal is received. The power off timer 154 will sense brief interruptions of power from the power supply component 142, and as long as such interruptions are less than the predetermined time, the power off timer 154 will not produce a reset signal. Once the timer 154 detects an interruption of power greater than a predetermined time, i.e., one tenth of a second, a reset signal will be sent to the flip flop 160 which will cease power to the relay 146 thereby opening the relay 146 discontinuing power to the vehicle 12. The assembly 140 will allow re-powering upon production of the set signal.

Figure 4:
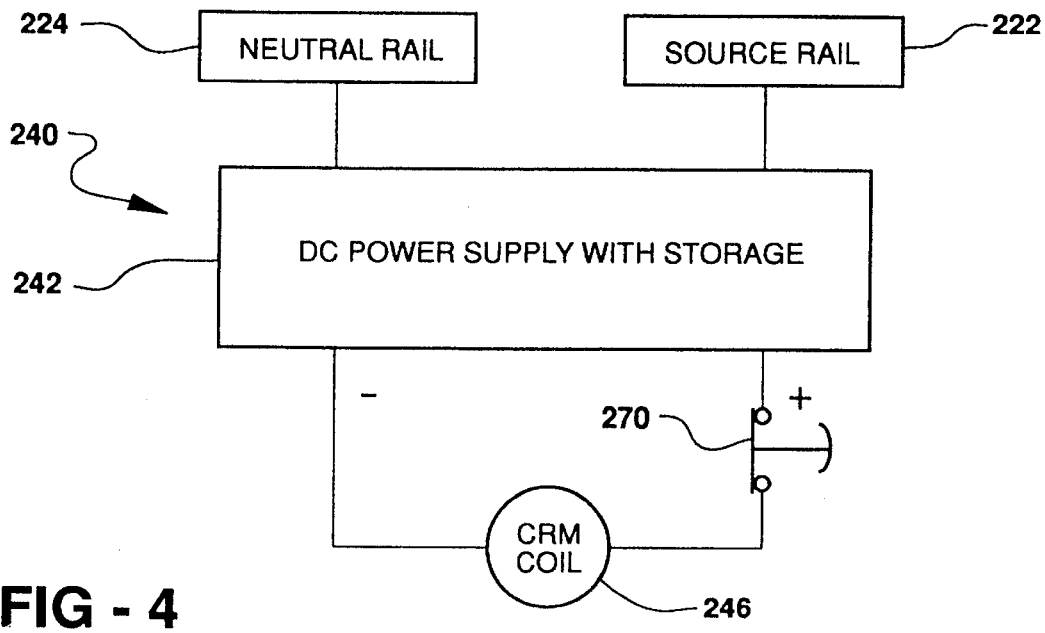
FIG. 4 is a schematic diagram of a second embodiment of the subject invention.

The second embodiment 240 is illustrated in FIG. 4. The power storage component 242 comprises a dc power supply with storage capacity to maintain power during power interruptions with the output connected to the relay switch 246 allowing the relay 246 to be energized during contact skips or power interruptions. The storage component 242 may be a commonly available open frame unit. The power storage component 246 is electrically connected to at least two of the rails 20 (i.e., source rail 222 and neutral rail 224). The output of the power storage component 242 is connected on the neutral side to the power relay 246 and on the source side through a detented manual push button 270 to the power relay 246. The emergency stop push button 270 is connected between the relay switch 246 and the dc power supply 242 for allowing manual interruption of power to the relay switch 246. Alternatively or in addition, one or more normally closed switches may be connected in series with the push button 270 to control power to the relay; such switches may be controlled based on internal or external conditions, i.e., for safety such as a crash bumper contact switch. (Such switches may be used in each of the embodiments). The push button 270 allows for manual interruption of power to de-power the vehicle 12. The storage component 242 will supply power to the control relay 246 only for a predetermined time during power interruption. When the push button 270 is closed, power will be provided to the vehicle 12 if power is on the rails 224, 222. When the push button 270 is open, the motor 16 is not powered. The push button 270 must be manually moved to the open or closed position and maintains such position until re-moved.

Figure 5:
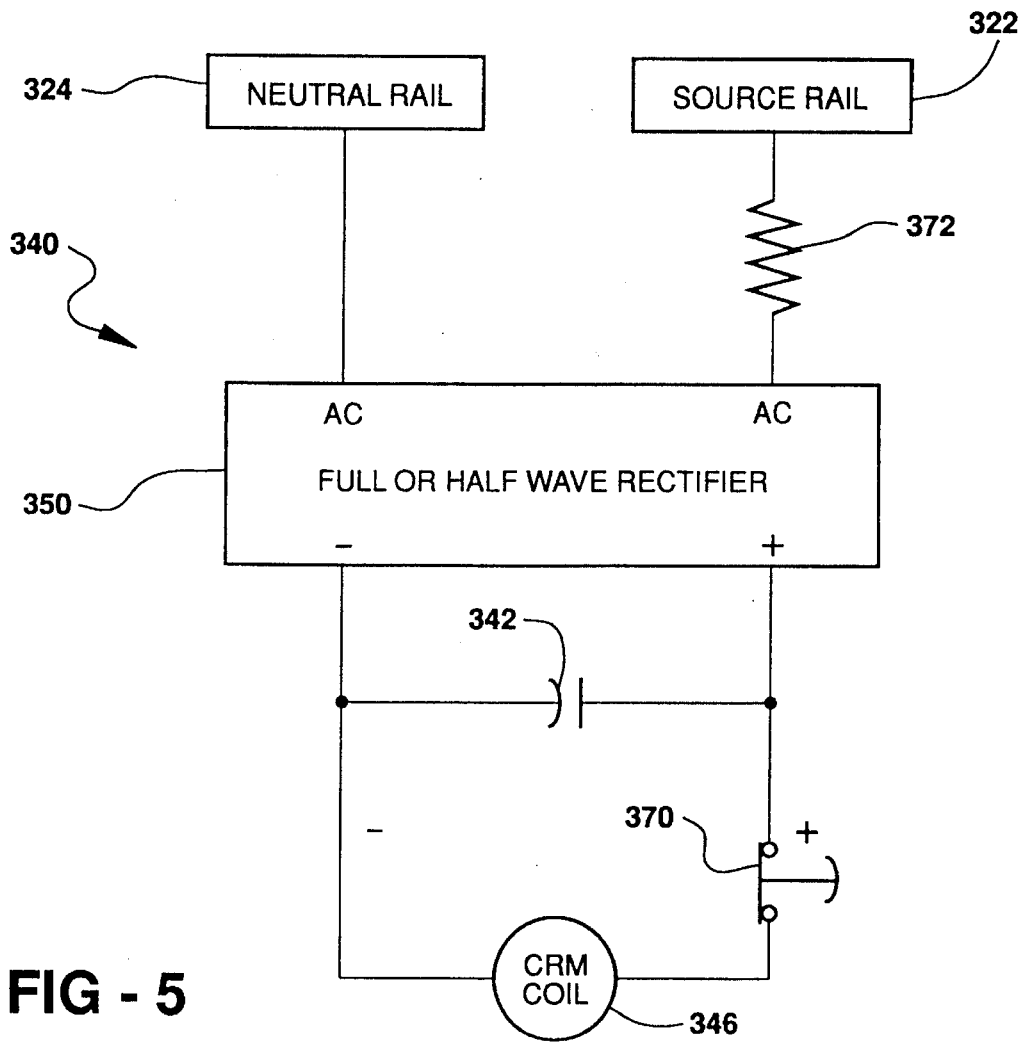
FIG. 5 is a schematic diagram of a third embodiment of the subject invention.

The third embodiment 340 is illustrated in FIG. 5. In this embodiment, a full or halfwave rectifier 350 is connected to both the neutral 324 and source 322 rails through the power conductors 30. A limiting resistor 372 is included to limit the inrush of current when power is turned on. The output of the rectifier 350 includes a dc neutral and source line which are interconnected by a storage capacitor 342 to delay relay turn off. As in the previous embodiment, a control relay 346 is connected in parallel with the storage capacitor 342, and a push button 370 is connected in the dc source line for manual interruption. The storage capacitor 342 maintains the relay closed 346 during brief power interruption for a predetermined time. If a power interruption exceeds the predetermined time, the control relay 346 will be opened. Upon power re-start, the relay 346 will be connected. The push button 310 is operated as in the second embodiment 240.

Figure 6:
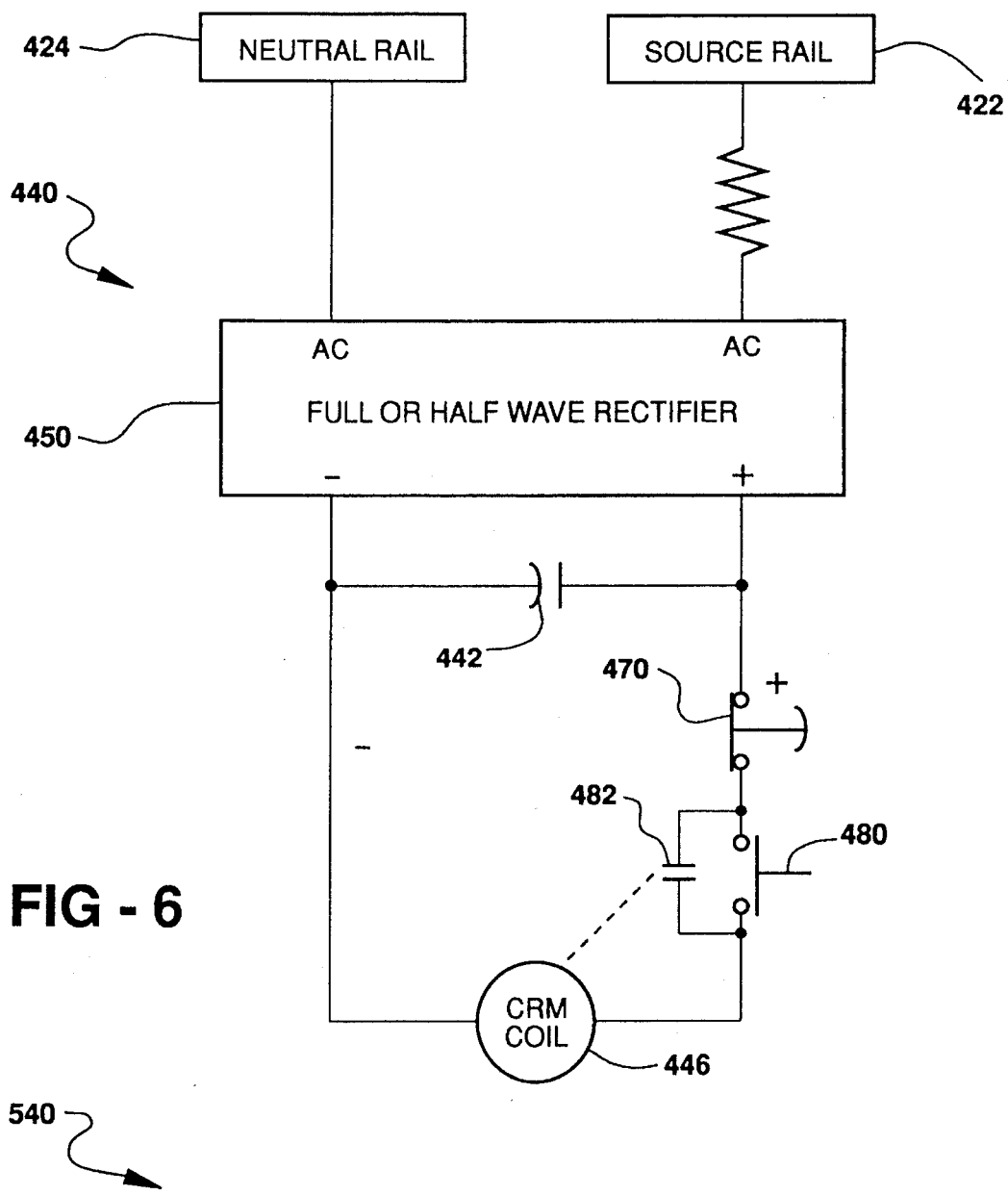
FIG. 6 is a schematic diagram of a fourth embodiment of the subject invention.

FIG. 6 illustrates the fourth embodiment 440 of the subject invention. The fourth embodiment 440 is the same as the third embodiment 340, except that an additional start push button 480 is included with a parallel, auxiliary relay contact 482 to electrically seal the relay 446, to allow manual starting of the vehicle 12. The start push button 480 (normally open, biased open) must be closed to energize the relay 446 which closes contact 482, and maintains contact 482 closed thereby bypassing the button 480 to close the circuit as long as power is received. The contact 482 will open upon de-energization of relay 446 requiring the push button 480 to be again depressed to power the vehicle 12.

Figure 7:
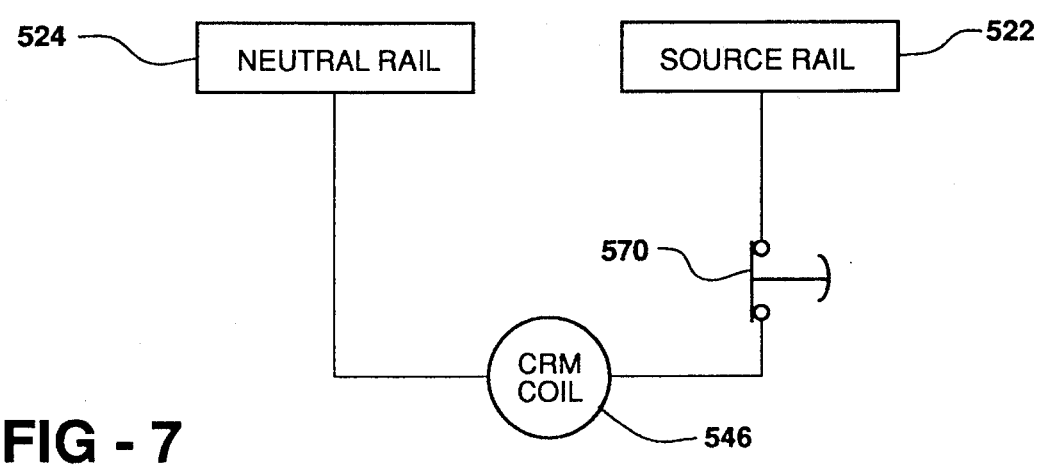
FIG. 7 is a schematic diagram of a fifth embodiment of the subject invention.

FIG. 7 illustrates the fifth embodiment 540 which uses the neutral 524 and source 522 rails with an emergency push button 570 connected to the source line and to the power relay 546. The power relay 546 has an ac coil and internal dash pot to mechanically delay turn off. The pneumatic or hydraulic dash pot provides the power delay mechanism which is built into the relay 546.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A safety assembly for use in a remotely powered vehicle system including a vehicle movable about a guide track and including power conductors on the vehicle for picking up neutral and source power on rails extending about the guide track to supply power to an on-board controller and motor on the vehicle which provides movement thereof, said assembly comprising:

power storage component (42) for receiving power through vehicle contacts from source and neutral power conductors to store power;

power switch circuit (44) operatively connected between said power storage component (42) and the vehicle motor (16) for controlling the connection of power to the vehicle motor (16) for a predetermined time upon interruption of power to the power conductors or loss of neutral power and for controlling the disconnection of power from the vehicle motor (16) when no power is received on the power conductors during said predetermined time.

2. An assembly as set forth in claim 1 further characterized by including a switch (46) for connecting power from the power conductors (30) to the vehicle motor (16) and disconnecting power from the vehicle motor (16) upon cessation of power on the power conductors (30) after said predetermined time and to connect power to the vehicle motor (16) when receiving power and during loss of power for less than said predetermined time.

3. An assembly as set forth in claim 2 further characterized by said switch (46) including a power relay.

4. An assembly as set forth in claim 2 further characterized by said power storage component (42) comprising a dc power storage supply (142) connected to said vehicle contacts.

5. An assembly as set forth in claim 4 further characterized by said power switch circuit (44) comprising a power monitor opto-isolator circuit (150), a flip flop (160) having a set and reset input and a control signal output to control said switch (46), and a power on one shot (152) connected to said opto isolator circuit (150) producing a set output and a power off timer (154) connected to said opto isolator circuit (150) producing said reset signal so that upon initiation of power, said power on one shot (152) will set said flip flop (160) to close said switch (46), and upon power ceasing for said predetermined time, said power off timer (154) will produce said reset to open said switch (46).

6. An assembly as set forth in claim 5 further characterized by including an input signal isolation circuit (164) for receiving an input signal off an external control rail to set said flip flop (160).

7. An assembly as set forth in claim 2 further characterized by said power storage component comprising a dc storage power supply to maintain power during contact skips with the output of said dc power supply (242) connected to said switch (46).

8. An assembly as set forth in claim 7 further characterized by including an emergency stop push button (370) connected between said switch (46) and said dc power supply (242) for allowing manual interruption of power to said switch (46).

9. An assembly as set forth in claim 2 further characterized by said power storage component (342) including a rectifier circuit (350) receiving power from the vehicle contacts, and a storage capacitor (342) connected to the output of said rectifier circuit (350) for charging to supply power for said predetermined time.

10. An assembly as set forth in claim 9 further characterized by including an emergency stop push button (320) connected between said switch (46) and said dc power supply for allowing manual interruption of power to said switch (46).

11. A conveyer vehicle assembly which moves along a guide rail and is powered from external rail voltages (20) said vehicle assembly comprising:

wheels (14) for mobility;

a motor (16) within said vehicle (12) for rotating said wheels (14);

power conductors (30) for picking up power from said rail voltages to supply power to said vehicle assembly (12);

vehicle controller (28) for receiving said power to control said motor (16);

said assembly characterized by including a safety assembly (40) having a switch for connecting power to said motor (16) for a predetermined time upon interruption of power on said power conductors (30) and disconnecting power from said motor (16) after said predetermined time when no power is received on said power conductors (30) during said predetermined time.

12. A method of controlling power to a remotely powered vehicle system including a vehicle movable about a guide track and including power conductors on the vehicle for picking up neutral and source power from rails extending about the guide track to supply power to an on-board controller and motor track to supply power to an on-board controller and motor of the vehicle to provide movement thereof, the method comprising the steps of:

(A) receiving power from the power conductors off the power rails;

(B) supplying power to the motor while power is received on the power conductors;

(C) storing power from the power conductors;

(D) sensing an interruption of power on the power conductors;

(E) supplying power to the motor upon sensing an interruption in step (D) by switching on the power that is stored in step (C) for a predetermined time after the interruption of power has occurred; and (F) disconnecting power from the motor by switching off the stored power after the predetermined time during which interruption of power has continued.

13. A method as set forth in claim 12 further including automatically re-supplying power to the motor upon power being received on the power conductors after the predetermined time of power interruption.

14. A method as set forth in claim 12 further including maintaining the disconnection of power from the motor after the predetermined time of power interruption and while the power conductors receive power until manual switch operation.

15. A method as set forth in claim 12 further including disconnecting power from the motor upon manual switch operation.

16. A method as set forth in claim 12, further comprising simultaneously remotely supplying power to a plurality of motors on a plurality of vehicles, by switching power on to the respective motors while power is received on the power conductors and for a predetermined time after interruption of power has occurred.

17. A method as set forth in claim 16, further comprising automatically resupplying power to the respective motors, simultaneously, upon power being received on the power conductors after the predetermined time of power interruption.

* * * * *

UNITED STATES PATENT AND TRADEMARK OFFICE
CERTIFICATE OF CORRECTION

PATENT NO. : 5,503,260
DATED : April 2, 1996
INVENTOR(S) : Ron J. Riley

It is certified that error appears in the above-indentified patent and that said Letters Patent is hereby corrected as shown below:

Claim 12, column 8, lines 16-17 delete "track to supply power to an on-board controller and motor"

Signed and Sealed this

Second Day of July, 1996

Attest:

BRUCE LEHMAN

Attesting Officer    Commissioner of Patents and Trademarks